US009091884B2

United States Patent
Kim et al.

(10) Patent No.: US 9,091,884 B2
(45) Date of Patent: Jul. 28, 2015

(54) DISPLAY APPARATUS

(75) Inventors: Sang-Jae Kim, Seongnam-si (KR); SeungBeom Park, Seoul (KR); Kwang-Hyun Kim, Gunpo-si (KR); Ji-Hoon Kim, Hwaseong-si (KR); Beong-hun Beon, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 894 days.

(21) Appl. No.: 13/327,274

(22) Filed: Dec. 15, 2011

(65) Prior Publication Data

US 2012/0320173 A1 Dec. 20, 2012

(30) Foreign Application Priority Data

Jun. 14, 2011 (KR) ........................ 10-2011-0057643

(51) Int. Cl.
- *G02F 1/13363* (2006.01)
- *G09G 3/20* (2006.01)
- *G02F 1/1335* (2006.01)
- *G09G 3/36* (2006.01)

(52) U.S. Cl.
CPC .............. *G02F 1/13363* (2013.01); *G09G 3/20* (2013.01); *G02F 1/133514* (2013.01); *G02F 2001/133631* (2013.01); *G09G 3/3607* (2013.01); *G09G 2300/0452* (2013.01); *G09G 2320/0209* (2013.01)

(58) Field of Classification Search
CPC .......... G02F 1/133514; G02F 1/13363; G02F 2001/133631; G09G 2300/0452; G09G 2320/0209; G09G 3/20; G09G 3/3607
See application file for complete search history.

(56) References Cited

U.S. PATENT DOCUMENTS

| | | | | |
|---|---|---|---|---|
| 5,982,541 | A * | 11/1999 | Li et al. | 359/242 |
| 6,570,584 | B1 * | 5/2003 | Cok et al. | 345/690 |
| 2004/0012851 | A1 * | 1/2004 | Sato et al. | 359/464 |
| 2005/0225630 | A1 * | 10/2005 | Childers et al. | 348/51 |
| 2006/0158582 | A1 * | 7/2006 | Hwang | 349/80 |
| 2010/0289814 | A1 * | 11/2010 | Hsieh et al. | 345/602 |
| 2010/0289884 | A1 * | 11/2010 | Kang | 348/58 |
| 2011/0234950 | A1 * | 9/2011 | Yamada et al. | 349/109 |

FOREIGN PATENT DOCUMENTS

| | | |
|---|---|---|
| JP | 2007-017822 | 1/2007 |
| JP | 2010-204389 | 9/2010 |
| KR | 10-2003-0057636 | 7/2003 |

OTHER PUBLICATIONS

Cherenack et al., Amorphous-Silicon Thin-Film Transistors Fabricated at 300 C on a Free-Standing Foil Substrate of Clear Plastic, Nov. 2007, IEEE, vol. 38, No. 11, pp. 1-3.*

H. Kang, et al., "3.1: A Novel Polarizer Glasses-type 3D Displays with a Patterned Retarder", SID 10, Digest, pp. 1-4 (2010).

* cited by examiner

*Primary Examiner* — Sath V Perungavoor
*Assistant Examiner* — Peter D Le
(74) *Attorney, Agent, or Firm* — H.C. Park & Associates, PLC

(57) ABSTRACT

A display apparatus including a first insulating substrate, a plurality of pixels, a second insulating substrate, a color filter layer, and a pattern retarder. The first insulating substrate includes a plurality of pixel areas arranged in an array of rows and columns, which has a length in the row direction longer than a length in the column direction, and has a length in a row direction longer than a length in a column direction. The pixels are arranged in the pixel areas, respectively, to display a 2D image and a 3D image. Among the pixels, first to fourth pixels successively arranged in the column direction define a unit pixel that displays one color information, and the fourth pixel corresponds to the white color pixel.

19 Claims, 16 Drawing Sheets

DISPLAY APPARATUS

CROSS-REFERENCE TO RELATED APPLICATION

This application claims priority from and the benefit of Korean Patent Application No. 10-2011-0057643 filed on Jun. 14, 2011, which is hereby incorporated by reference for all purposes as if fully set forth herein.

BACKGROUND

1. Field

Exemplary embodiments of the present invention relate to a display apparatus. More particularly, exemplary embodiments of the present invention relate to a display apparatus capable of displaying a two-dimensional (2D) image and a three-dimensional (3D) image.

2. Discussion of the Background

A display apparatus that displays a 3D image is classified into a glass type 3D image display apparatus and a non-glass type 3D image display apparatus. The glass type 3D image display apparatus provides a wide viewing angle and does not cause dizziness in the head when users view and appreciate images. In addition, when compared with the non-glass type 3D image display apparatus, a manufacturing process of the glass type 3D image display apparatus is much simpler and a manufacturing cost of the glass type 3D image display apparatus is much lower.

In recent times, the glass-type 3D image display apparatus has been divided into a time division method that alternately displays a left-eye image and a right-eye image according to a time-divided image signal and a spatial division method that displays the left-eye image and the right-eye image using pixels that are spatially divided. In the time division method, the left-eye image and the right-eye image are alternately displayed on a single screen and opening and shutting timing of left eye-glass and right eye-glass of the glasses corresponds to a time-division period of the image. Accordingly, the users perceive the left-eye image and the right-eye image independently, so that the users perceive the 3D image. In the spatial division method, two different images are displayed in different polarizing directions on a single screen while a pixel is divided into two parts in a row or column direction. The users independently perceive the two different images through polarizing glasses equipped with polarizing lenses, thereby perceiving the 3D image.

SUMMARY OF THE INVENTION

Exemplary embodiments of the present invention provide a display apparatus capable of displaying a 2D image and a 3D image.

Exemplary embodiments of the present invention provide a display apparatus capable of reducing crosstalk when displaying the 3D image.

Additional features of the invention will be set forth in the description which follows, and in part will be apparent from the description, or may be learned by practice of the invention.

According to the exemplary embodiments, a display apparatus includes a first insulating substrate, a plurality of pixels, a second insulating substrate, a color filter layer, and a pattern retarder. The first insulating substrate includes a plurality of pixel areas arranged in an array of row and column, the first insulating substrate has a length in a row direction longer than a length in a column direction, and each of the pixel areas has a length in the row direction longer than a length in the column direction. The plurality of pixels is arranged in the pixel areas, respectively, to display an image in response to an image signal applied thereto. The second insulating substrate faces the first insulating substrate. The color filter layer is disposed on the second insulating substrate and includes color pixels corresponding to the pixel areas in a one-to-one correspondence. The color pixels include red, green, blue, and white color pixels. The pattern retarder is disposed to face the first insulating substrate while interposing the second insulating substrate between the first insulating substrate and the pattern retarder to split light passing through the first and second insulating substrates into two lights having different polarizing axes from each other. Among the pixels, first to fourth pixels successively arranged in the column direction define a unit pixel that displays one color information, and the fourth pixel corresponds to the white color pixel.

The display apparatus further includes a driving circuit driven in a first mode in which a 2D image is displayed or in a second mode in which a 3D image is displayed, and the driving circuit applies a 2D image signal to the pixels in the first mode and applies a 3D image signal to the pixels in the second mode. A black image signal is applied to the fourth pixel such that the fourth pixel displays a black color in the second mode.

According to the exemplary embodiments, a display apparatus includes a first insulating substrate, a plurality of pixels, a second insulating substrate, a color filter layer, and a pattern retarder. The first insulating substrate includes a plurality of pixel areas arranged in an array of row and column, the first insulating substrate has a length in a row direction longer than a length in a column direction, and each of the pixel areas has a length in the row direction longer than a length in the column direction. The plurality of pixels is arranged in the pixel areas, respectively, to display an image in response to an image signal applied thereto. The second insulating substrate faces the first insulating substrate. The color filter layer is disposed on the second insulating substrate and includes color pixels corresponding to the pixel areas in a one-to-one correspondence, and the color pixels includes red, green, blue, cyan, magenta, and yellow color pixels. The pattern retarder is disposed to face the first insulating substrate while interposing the second insulating substrate between the first insulating substrate and the pattern retarder to split light passing through the first insulating substrate and the second insulating substrate into two lights having different polarizing axes from each other. Among the pixels, first to sixth pixels arranged in 3 rows (first, second, and third rows) by 2 columns (first and second columns) define a unit pixel that displays one color information, and each of the first to sixth pixels corresponds to a different one of the red, green, blue, cyan, magenta, and yellow color pixels.

The display apparatus further includes a driving circuit driven in a first mode in which a 2D image is displayed or in a second mode in which a 3D image is displayed, and the driving circuit applies a 2D image signal to the pixels in the first mode and applies a 3D image signal to the pixels in the second mode. A black image signal is applied to the pixels arranged in the third row such that the pixels arranged in the third row display a black color in the second mode. The pixels arranged in the third row correspond to the magenta color pixel and the cyan color pixel.

According to the above, the display apparatus may display the 2D image and the 3D image having excellent color reproducibility and high brightness. In addition, the display apparatus may prevent a crosstalk phenomenon when the display apparatus displays the 3D image, thereby displaying a high quality image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATED EMBODIMENTS

Figure 1:
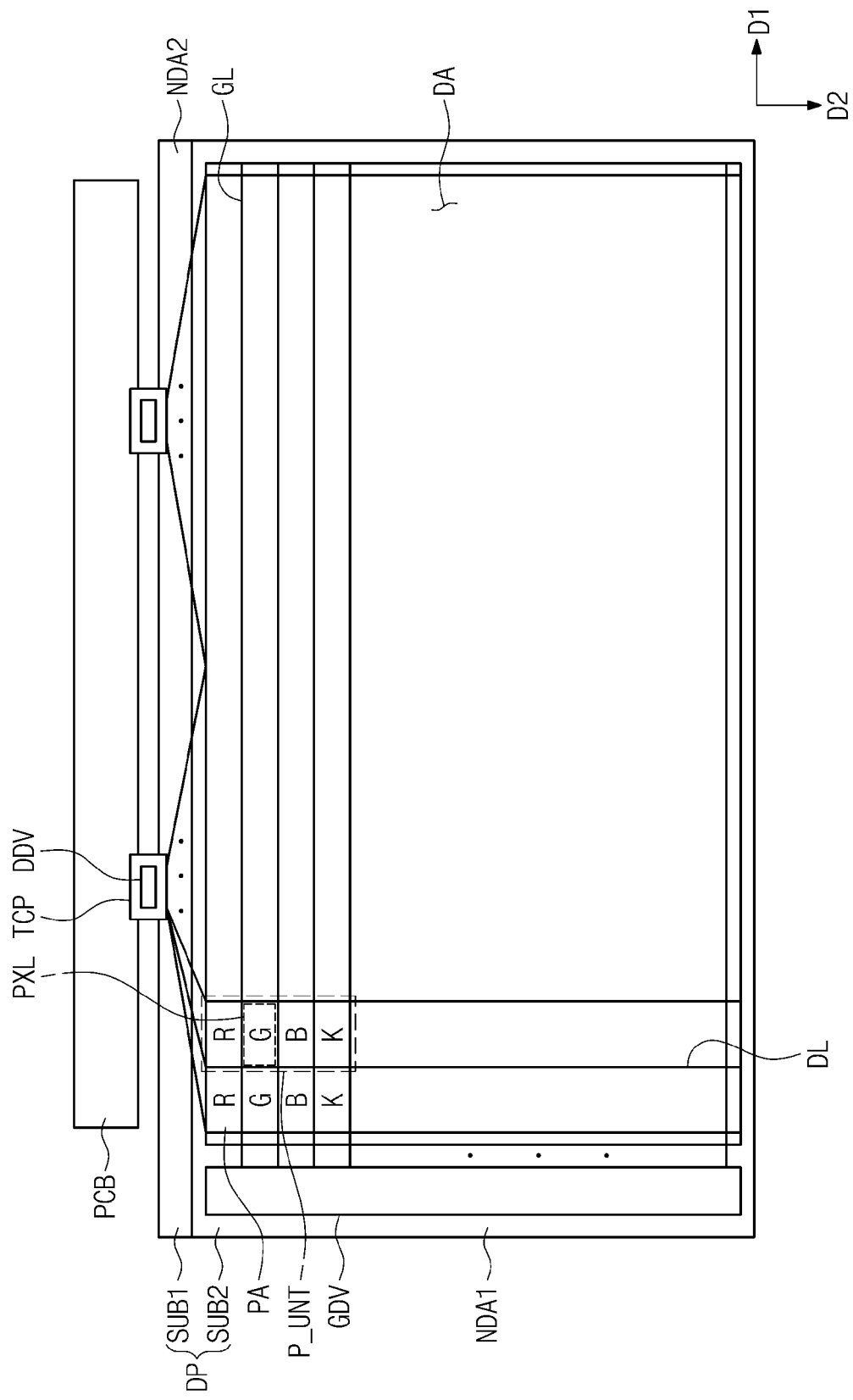
FIG. 1 is a plan view showing a display apparatus according to a first exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or a feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Figure 2:
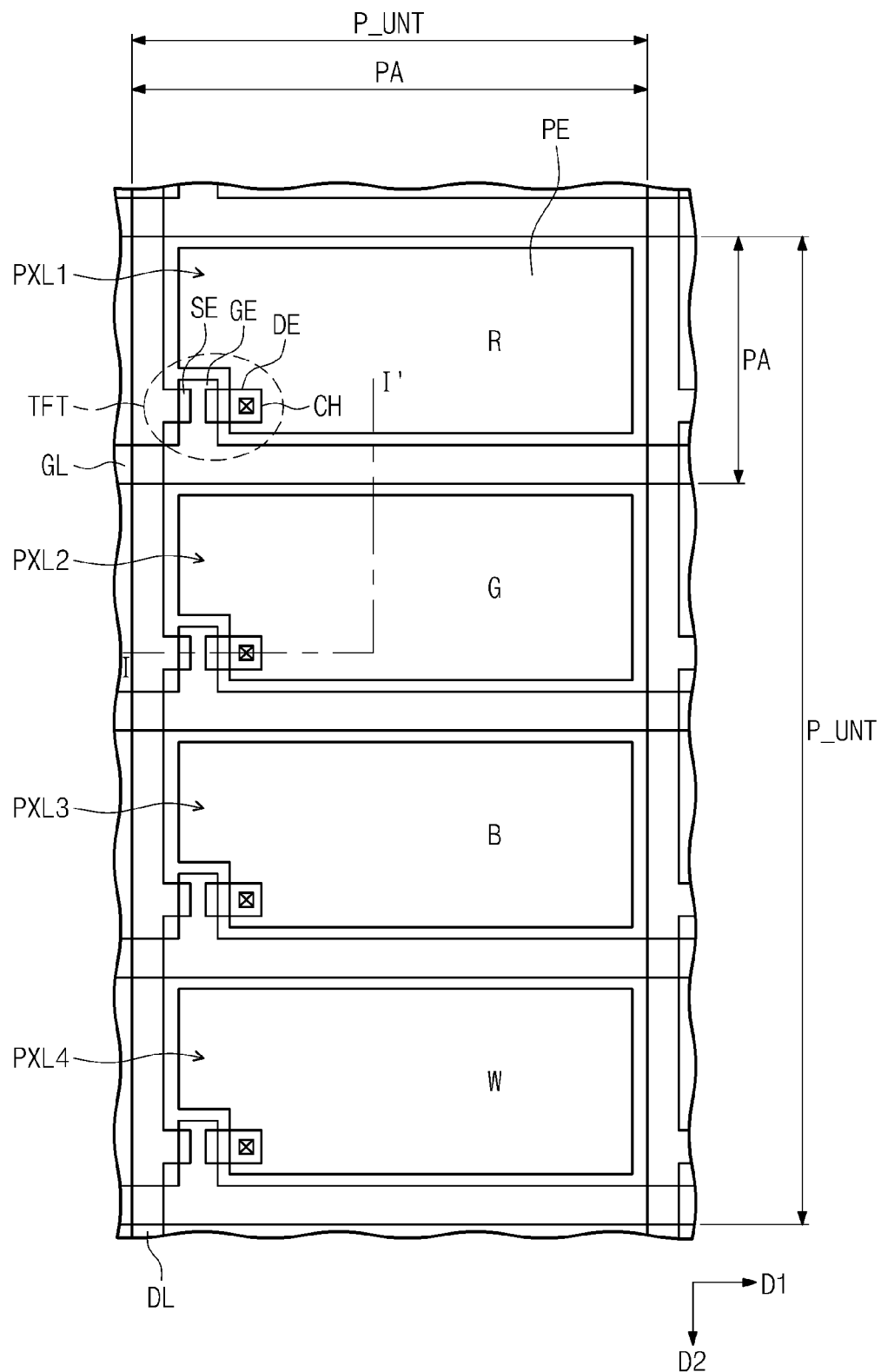
FIG. 2 is a plan view showing a pixel of FIG. 1.
Figure 3:
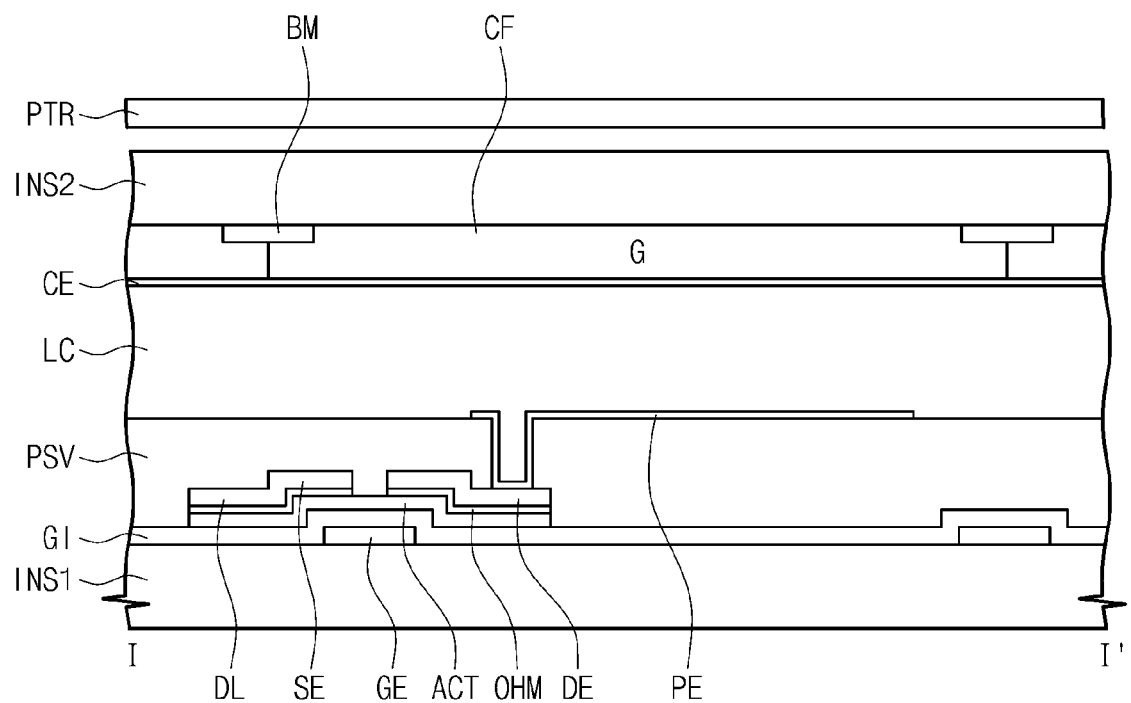
FIG. 3 is a cross-sectional view taken along a line I-I' of FIG. 2.

FIG. 1 is a plan view showing a display apparatus according to a first exemplary embodiment of the present invention, FIG. 2 is a plan view showing a pixel of FIG. 1, and FIG. 3 is a cross-sectional view taken along a line I-I' of FIG. 2.

The display apparatus according to the first exemplary embodiment of the present invention may be driven in a two-dimensional image mode (hereinafter, referred to as a first mode) in which a two-dimensional (2D) image is displayed or in a three-dimensional image mode (hereinafter, referred to as a second mode) in which a three-dimensional (3D) image is displayed. Thus, first of all, a structure of the display apparatus will be described, and then a principle of displaying the 3D image on the display apparatus will be described.

Referring to FIG. 1, the display apparatus includes a display panel DP, a printed circuit board PCB provided adjacent to the display panel DP, and a tape carrier package TCP electrically connecting the printed circuit board PCB to the display panel DP.

The display panel DP displays an image. The display panel DP includes a plurality of pixels PXL. The display panel DP may be a liquid crystal display panel, an organic light emitting display panel, an electrophoretic display panel, an electrowetting display panel, or a microelectromechanical system display panel. In the present exemplary embodiment, the liquid crystal display panel will be representatively described as the display panel DP.

The display panel DP includes a first substrate SUB1, a second substrate SUB2 facing the first substrate SUB1, a liquid crystal layer LC interposed between the first substrate SUB1 and the second substrate SUB2, a pattern retarder PTR disposed on the second substrate SUB2.

The first substrate SUB1 includes a first insulating substrate INS1, a plurality of gate lines GL, a plurality of data lines DL, a plurality of pixels PXL, and a gate driving circuit GDV.

The first insulating substrate INS1 has a rectangular shape including a pair of long sides and a pair of short sides. The first insulating substrate INS1 includes a display area DA in which the pixels PXL are provided to display the image and first and second non-display areas NDA1 and NDA2 adjacent to the display area DA, in which the image is not displayed. The first non-display area NDA1 is adjacent to ends of the gate lines GL to be adjacent to one of the short sides of the first insulating substrate INS1. The second non-display area NDA2 is adjacent to ends of the data lines DL to be adjacent to one of the long sides of the first insulating substrate INS1.

The display area DA is divided into a plurality of pixel areas PA arranged in an array of rows and columns to correspond to the pixels PXL in a one-to-one correspondence. In the present exemplary embodiment, a row direction D1 of the rows and columns is substantially parallel to the long sides of the first insulating substrate INS1, so that a length of the row direction D1 of the first insulating substrate INS1 is longer than a length of the column direction D2 of the first insulating substrate INS1.

The gate lines GL are arranged on the first insulating substrate INS1 and extended in the row direction D1. The data lines DL are extended in the column direction D2 substantially perpendicular to the row direction D1. The data lines DL are disposed on the first insulating substrate INS1 and electrically insulated from the gate lines GL while interposing a gate insulating layer GI between the gate lines GL and the data lines DL.

The pixels PXL are disposed corresponding to the pixel areas PA, respectively. Each pixel PXL is connected to a corresponding gate line of the gate lines GL and a corresponding data line of the data lines DL. The pixel areas PA may be defined by the gate lines GL and the data lines DL, which are disposed on the first insulating substrate INS1.

Each pixel PXL has a horizontal pixel structure in which a length of the pixel PXL in the row direction D1 is longer than a length of the pixel PXL in the column direction D2. In the horizontal pixel structure, first to fourth pixels PXL1 to PXL4 sequentially arranged in the row direction D2 are defined as a unit pixel P_UNT to display one color. In other words, the unit pixel P_UNT includes the first to fourth pixels PXL1 to PXL4 arranged in four row by one column matrix, and thus the display area DA includes a plurality of unit pixels P_UNT arranged in an array of rows and columns.

Each pixel PXL includes a thin film transistor TFT and a pixel electrode PE connected to the thin film transistor TFT. The thin film transistor TFT includes a gate electrode GE, a semiconductor layer SM, a source electrode SE, and a drain electrode DE.

The gate electrode GE is branched from the gate line GL. The semiconductor layer SM is disposed on the gate electrode GE while interposing the gate insulating layer GI therebetween. The gate insulating layer GI is disposed on a whole surface of the first gate insulating substrate INS1, on which the gate line GL and the gate electrode GE are formed, to cover the gate line GL and the gate electrode GE. The semiconductor layer SM includes an active layer ACT disposed on the gate insulating layer GI and an ohmic contact layer OHM disposed on the active layer ACT. The source electrode SE is branched from the data line DL and the source electrode DE is spaced apart from the source electrode SE while interposing the gate electrode GE therebetween when viewed in a plan view. The source electrode SE and the drain electrode DE are partially overlapped with the gate electrode GE when viewed in a plan view.

The pixel electrode PE is connected to the drain electrode DE while disposing a protective layer PRT therebetween. The protective layer PRT is provided with a contact hole CH formed therethrough to expose a portion of the drain electrode DE, and the pixel electrode PE makes contact with the portion of the drain electrode DE through the contact hole CH.

The gate driving circuit GDV is disposed in the first non-display area NDA1. The gate driving circuit GDV is connected to the gate lines GL to sequentially apply gate signals to the gate lines GL. The gate driving circuit GDV may be a plurality of amorphous silicon type transistors that are directly formed on the first insulating substrate INS1. The gate driving circuit GDV may be substantially simultaneously formed with the pixels PXL by a thin film process applied to form the pixels PXL on the first insulating substrate INS1. As described above, since the gate driving circuit GDV is directly integrated on the first substrate SUB1, driving chips in which the gate driving circuit GDV is integrated may be removed from the display apparatus, thereby improving the productivity of the display apparatus and reducing the size of the display apparatus.

Meanwhile, the second substrate SUB2 includes a second insulating substrate INS2 coupled with the first insulating substrate INS1, a color filter layer CF including a plurality of color pixels, a black matrix BM disposed between the color pixels, and a common electrode CE disposed on the color filter layer CF and the black matrix BM.

The color pixels of the color filter layer CF correspond to the pixel areas PA in a one-to-one correspondence. The color pixels include a red color pixel R, a green color pixel G, a blue color pixel B, and a white color pixel W. The red, green, and blue color pixels R, G, and B of the color pixels may correspond to the first, second, and third pixels PXL1, PXL2, and PXL3. For instance, in the first present exemplary embodiment, the first, second, and third pixels PXL1, PXL2, and PXL3 may respectively correspond to the red, green, and blue color pixels R, G, and B. In addition, in another exemplary embodiment, the first pixel PXL1, the second pixel PXL2, and the third pixel PXL3 may respectively correspond to the blue color pixel B, the red color pixel R, and the green color pixel G. The white color pixel W corresponds to the fourth pixel PXL4.

In the present exemplary embodiment, the color filter layer CF is disposed on the second insulating substrate INS2, but should not be limited thereto or thereby. That is, although not shown in figures, the color filter layer CF may be disposed on the first insulating substrate INS1 as a color filter on array (COA) instead of being disposed on the second insulating substrate INS2.

The pattern retarder PTR is disposed on the second substrate SUB2. In detail, the pattern retarder PTR faces the first insulating substrate INS1 while interposing the second insulating substrate INS2 between the pattern retarder PTR and the first insulating substrate INS1. The pattern retarder PTR may be attached to the second insulating substrate INS2 by an adhesive. The pattern retarder PTR transmits light from the display panel DP without polarizing the light during the first mode and polarizes the light from the display panel DP into two circularly polarized lights or two lights having different polarizing directions. The pattern retarder PTR is provided to display the 3D image and details of the pattern retarder PTR will be described in detail later.

The printed circuit board PCB is disposed adjacent to the second non-display area NDA2 and applies a gate control signal and a data control signal to the gate driving circuit GDV and the data driving circuit DDV of the display panel DP, respectively, according to the first mode and the second mode. The tape carrier package TCP is disposed between the second non-display area NDA2 and the printed circuit board PCB. Accordingly, a first end of the tape carrier package TCP is attached to the second non-display area NDA2 and a second end of the tape carrier package TCP is attached to the printed circuit board PCB. The data driving circuit DDV is mounted on the tape carrier package TCP to apply data signals to the data lines DL. The gate control signal output from the printed circuit board PCB is provided to the gate driving circuit GDV through the tape carrier package TCP. The data driving circuit DDV may apply the data signals in the first or second mode to the data lines DL in response to the data control signal in the first or second mode, which is provided from the printed circuit board PCB.

In the above-described structure of the display apparatus, when the thin film transistor is turned on in response to a driving signal provided through the gate line GL, the data signal is applied to the pixel electrode PE through the data line DL. Thus, an electric field is generated between the pixel electrode PE and the common electrode CE to which a common voltage is applied, so liquid crystals in the liquid crystal layer LC are driven according to the electric field. As a result, the amount of the light passing through the liquid crystal layer LC may be controlled, thereby displaying the image corresponding to the amount of the light passing through the liquid crystal layer LC. In this case, the driving signal and the data signal respectively provided through the gate line GL and the data line DL are varied according to the first mode and the second mode.

Figure 4:
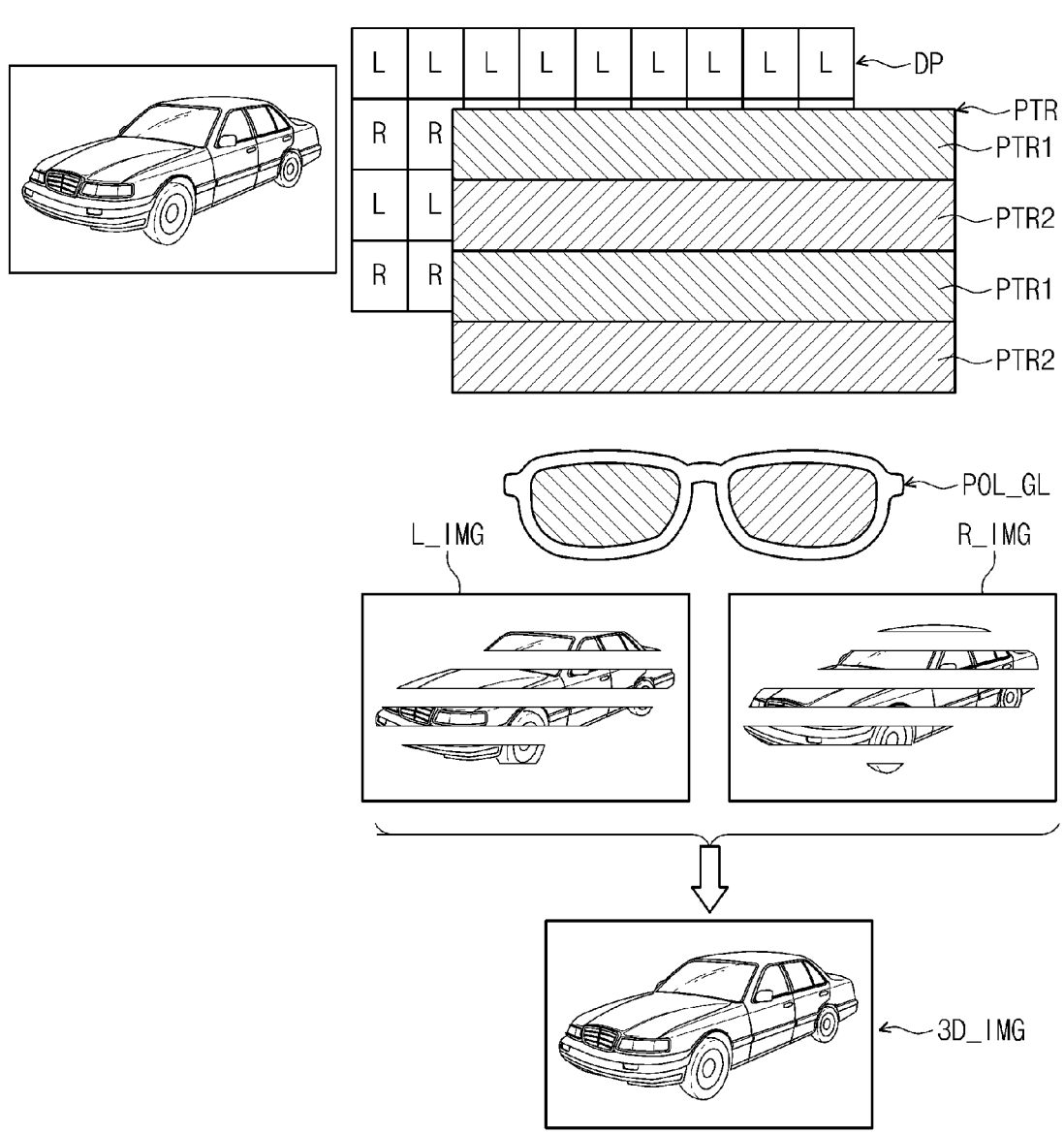
FIG. 4 is a view showing a principle of displaying a 3D image when the display apparatus shown in FIG. 1 is driven in a second mode.

FIG. 4 is a view showing a principle of displaying a 3D image when the display apparatus shown in FIG. 1 is driven in a second mode. In FIG. 4, for the convenience of explanation, the display apparatus has been schematically shown with the display panel DP and the pattern retarder PTR.

Referring to FIG. 4, left-eye data signals L and right-eye data signals R are alternately applied to the unit pixels P_UNT during the second mode. For instance, the left-eye data signals L are applied to the unit pixels P_UNT arranged in odd-numbered rows and the right-eye data signals R are applied to the unit pixels P_UNT arranged in even-numbered rows. Thus, the unit pixels P_UNT in the odd-numbered rows display the left-eye image and the unit pixels P_UNT in the even-numbered rows display the right-eye image.

Light for the left-eye image and the light for the right-eye image is split into two polarization components by the pattern retarder PTR. The pattern retarder PTR includes a first retarder PTR1 corresponding to the odd-numbered unit pixels P_UNT and a second retarder PTR2 corresponding to the even-numbered unit pixels P_UNT. The first retarder PTR1 has a light absorbing axis substantially vertical to a light absorbing axis of the second retarder PTR2. The first retarder PTR1 transmits a first polarization (circular polarization or linear polarization) component of the light for the left-eye image, and the second retarder PTR2 transmits a second polarization (circular polarization or linear polarization) component of the light for the right-eye image. As an example, the first retarder PTR1 may include a polarization filter to transmit a left-circular polarized light and the second retarder PTR2 may include a polarization filter to transmit a right-circular polarized light.

The left-eye image L_IMG according to the light passing through the first retarder PTR1 transmits through a left-eye glass of a polarization glass POL_GL and the right-eye image R_IMG according to the light passing through the second retarder PTR2 transmits through a right-eye glass of the polarization glass POL_GL, so that the 3D image may be provided to eyes of the users.

Figure 5A:
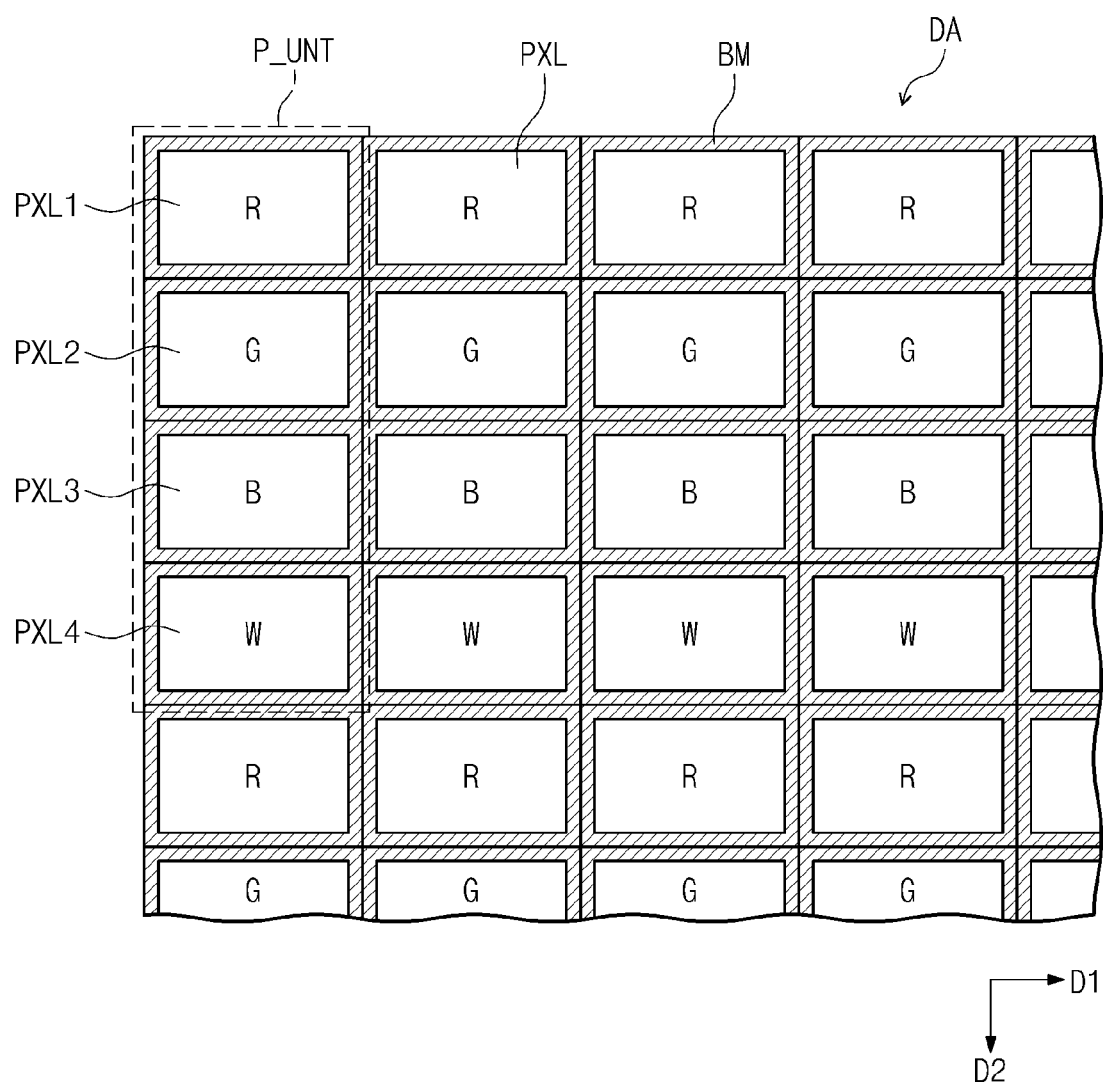
FIG. 5A is a plan view showing a display area when the display apparatus shown in FIG. 1 is driven in a first mode.
Figure 5B:
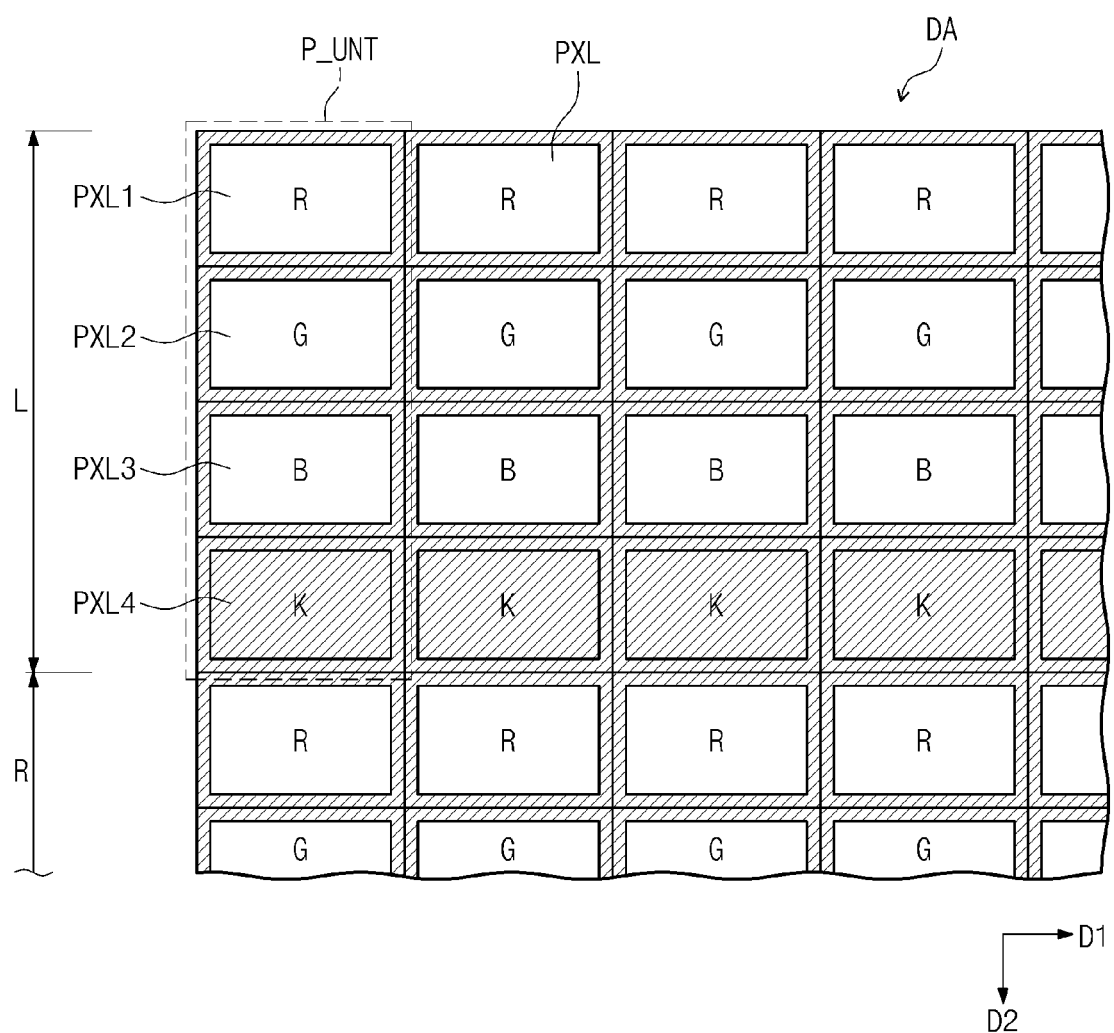
FIG. 5B is a plan view showing a display area when the display apparatus shown in FIG. 1 is driven in a second mode.

FIG. 5A is a plan view showing a display area when the display apparatus shown in FIG. 1 is driven in the first mode, and FIG. 5B is a plan view showing a display area when the display apparatus shown in FIG. 1 is driven in the second mode. In FIGS. 5A and 5B, for the convenience of explanation, the pixels PXL have been schematically shown with colors of the color pixels corresponding to the pixels PXL.

Referring to FIGS. 5A and 5B, the unit pixels P_UNT according to the first exemplary embodiment are arranged in the array of rows and columns. Each pixel unit P_UNT includes the first, second, third and fourth pixels PXL1, PXL2, PXL3, and PXL4 sequentially arranged in the column direction D2. The first, second, third, and fourth pixels PXL1, PXL2, PXL3, and PXL4 correspond to the red color pixel R, the green color pixel G, the blue color pixel B, and the white color pixel W, respectively. Each of the red, green, blue, and white color pixels R, G, B, and W is surrounded by the black matrix BM to block unwanted light leakage.

Referring to FIG. 5A, when the display apparatus is driven in the first mode, the data signals of the first mode are applied to the first to fourth pixels PXL1 to PXL4, so the image is displayed through the first to fourth pixels PXL1 to PXL4. The first to fourth pixels PXL1 to PXL4 respectively display the red, green, blue, and white color by the red, green, blue, and white color pixels R, G, B, and W, and the fourth pixel PXL4 corresponding to the white color pixel W enhances brightness of the color displayed by the unit pixel P_UNT.

The pattern retarder PTR transmits the image displayed by the first to fourth pixels PXL1 to PXL4 when the display apparatus is driven in the first mode, and thus the image displayed by the first to fourth pixels PXL1 to PXL4 is perceived to the users as it is.

Referring to FIG. 5B, when the display apparatus is driven in the second mode, the data signals of the second mode are applied to the first to fourth pixels PXL1 to PXL4. The data signals of the second mode include the left-eye data signals and the right-eye data signals. The left-eye data signals and the right-eye data signals are alternately applied to the unit pixels P_UNT arranged in a row. For instance, the left-eye data signals are applied to the unit pixels P_UNT arranged in the odd-numbered row and the right-eye data signals are applied to the unit pixels P_UNT arranged in the even-numbered row.

Each left-eye data signal includes first to fourth data signals that are applied to the first to fourth pixels PXL1 to PXL4, respectively. The first to third data signals are used to form the left-eye image. Since the first, second, and third pixels PXL1, PXL2, and PXL3 correspond to the red, green, and blue color pixels R, G, and B, respectively, the first to third pixels PXL1 to PXL3 to which the first to third data signals are applied form the left-eye color image.

In this case, the fourth data signal is a black image signal, and thus the fourth pixel PXL4 displays a black color K.

Similar to the left-eye data signals, each right-eye data signal includes first to fourth data signals applied to the first to fourth pixels PXL1 to PXL4, respectively. The first to third data signals are used to form the right-eye image. Since the first, second, and third pixels PXL1, PXL2, and PXL3 respectively correspond to the red, green, and blue color pixels R, G, and B, the first to third pixels PXL1 to PXL3 to which the first to third data signals are applied form the right-eye color image.

In this case, the fourth data signal is the black image signal, and thus the fourth pixel PXL4 displays a black color K.

When the left-eye data signals and the right-eye data signals are applied to the pixels PXL and the left-eye image and the right-eye image are formed, the pattern retarder PTR splits the left-eye image and the right-eye image into two polarization components. Accordingly, the image displayed by the first to third pixels PXL1 to PXL3 is perceived by the users wearing the polarization glass as the 3D image. According to the first exemplary embodiment, since the fourth pixel PXL4 displays the black color in an area in which the left-eye image overlaps with the right-eye image when the display apparatus is driven in the second mode, the crosstalk phenomenon caused by parallax between the left-eye image and the right-eye image may be prevented.

Figure 6A:
FIG. 6A and FIG. 6B are views showing images perceived by a user when a conventional display apparatus and a display apparatus according to the present invention are driven in the second mode.
Figure 6A:
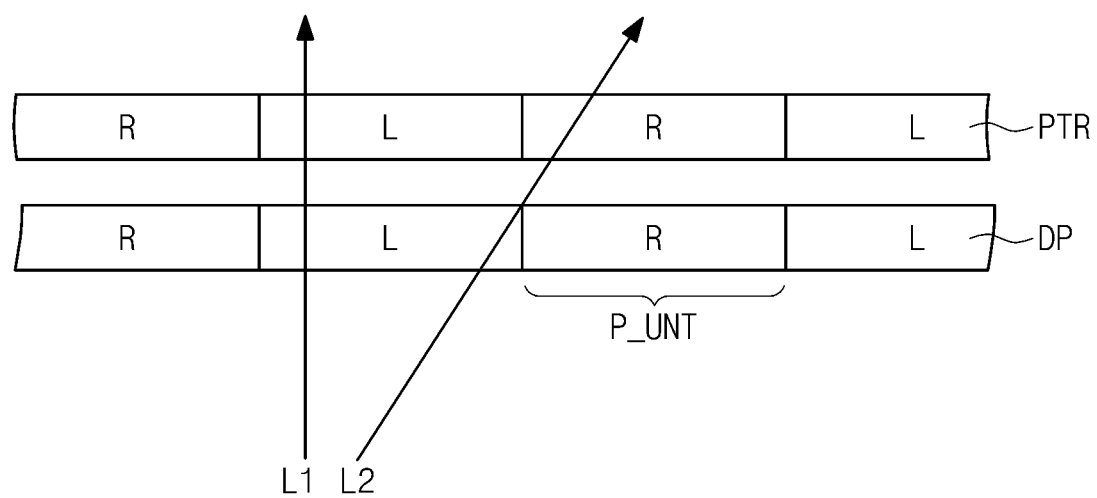
Figure 6B:
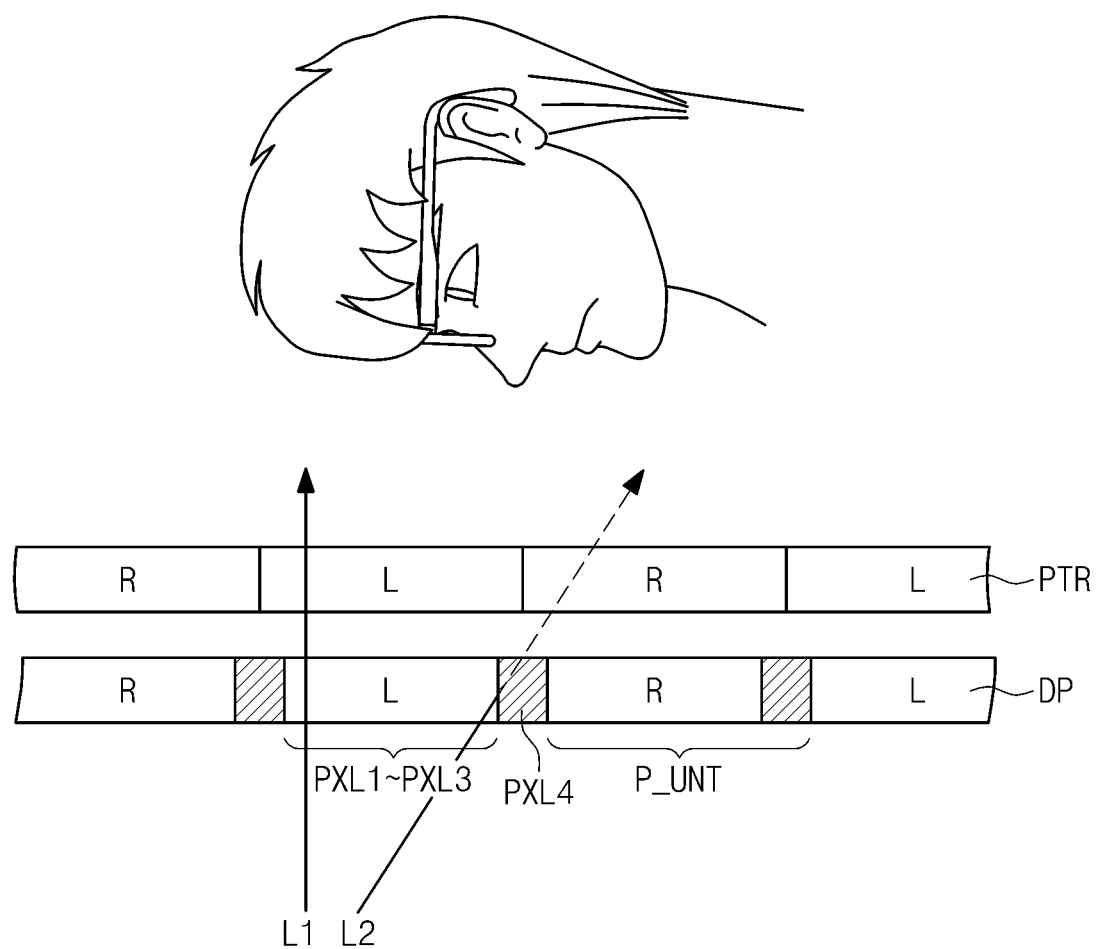

FIGS. 6A and 6B are views showing images perceived by a user when a conventional display apparatus and a display apparatus according to the present invention are driven in the second mode. In FIGS. 6A and 6B, for the convenience of explanation, the display panel and the pattern retarder PTR have been schematically shown. In addition, the unit pixel P_UNT forming the left-eye image is referred to as "L" and the unit pixel P_UNT forming the right-eye image is referred to as "R" in the display panel DP. Further, the first retarder PTR1 corresponding to the unit pixel P_UNT for the left-eye image and polarizing the light for the left-eye image is referred to as "L" and the second retarder PTR2 corresponding to the unit pixel P_UNT for the right-eye image and polarizing the light for the right-eye image is referred to as "R".

Referring to FIG. 6A, a light L1, which vertically passes through the display panel DP and the pattern retarder PTR, transmits through the unit pixel P_UNT for the left-eye image and the first retarder of the pattern retarder PTR to form the left-eye image. However, a light L2, which is inclined with respect to the display panel DP and the pattern retarder PTR while traveling to the display panel DP, transmits through the second retarder of the pattern retarder PTR after passing through the unit pixel P_UNT for the left-eye image of the display panel DP, so the crosstalk phenomenon of the 3D image occurs. Accordingly, visibility of the 3D image is deteriorated, thereby causing narrowing of an upper and lower viewing angle of a conventional polarization glass.

Referring to FIG. 6B, the light L1, which vertically passes through the display panel DP and the pattern retarder PTR, transmits through the unit pixel P_UNT for the left-eye image and the first retarder of the pattern retarder PTR to form the left-eye image. The light L2, which is inclined with respect to the display panel DP and the pattern retarder PTR while traveling to the display panel DP, is blocked by the fourth pixel PXL4 displaying the black image. Thus, the crosstalk phenomenon of the 3D image does not occur.

As described above, the display apparatus according to the first exemplary embodiment separately drives the fourth pixel PXL4 of the unit pixel P_UNT during the first mode and the second mode. Accordingly, the brightness of the image displayed by the display apparatus during the first mode may be improved and the crosstalk phenomenon in the display apparatus during the second mode may be prevented from occurring.

In addition, in the horizontal pixel structure, the number of the data lines DL is reduced and the number of the gate lines GL is increased when compared with a vertical pixel structure in which a length of the pixel PXL in the row direction D1 is shorter than a length of the pixel PXL in the column direction D2. Thus, the number of the data driving chips outputting the data signals may be reduced due to the reduction in the number of the data lines DL when the display apparatus employs the horizontal pixel structure, thereby improving the productivity of the display apparatus. In addition, although the number of the gate lines GL is increased, the total number of the chips on the display apparatus may be reduced since the gate driving circuit GDV is directly integrated on the first insulating substrate INS1 by the thin film process.

Further, when the display apparatus is driven in the second mode in which the 3D image is displayed using the pattern retarder PTR, the display apparatus may be driven at the frequency of about 60 Hz. The driving speed of the display apparatus may be achieved by the gate driving circuit GDV directly integrated on the first insulating substrate INS1. Accordingly, no additional driving chip like the gate driving circuit GDV is required, and thus the manufacturing cost of the display apparatus may be reduced.

Figure 7A:
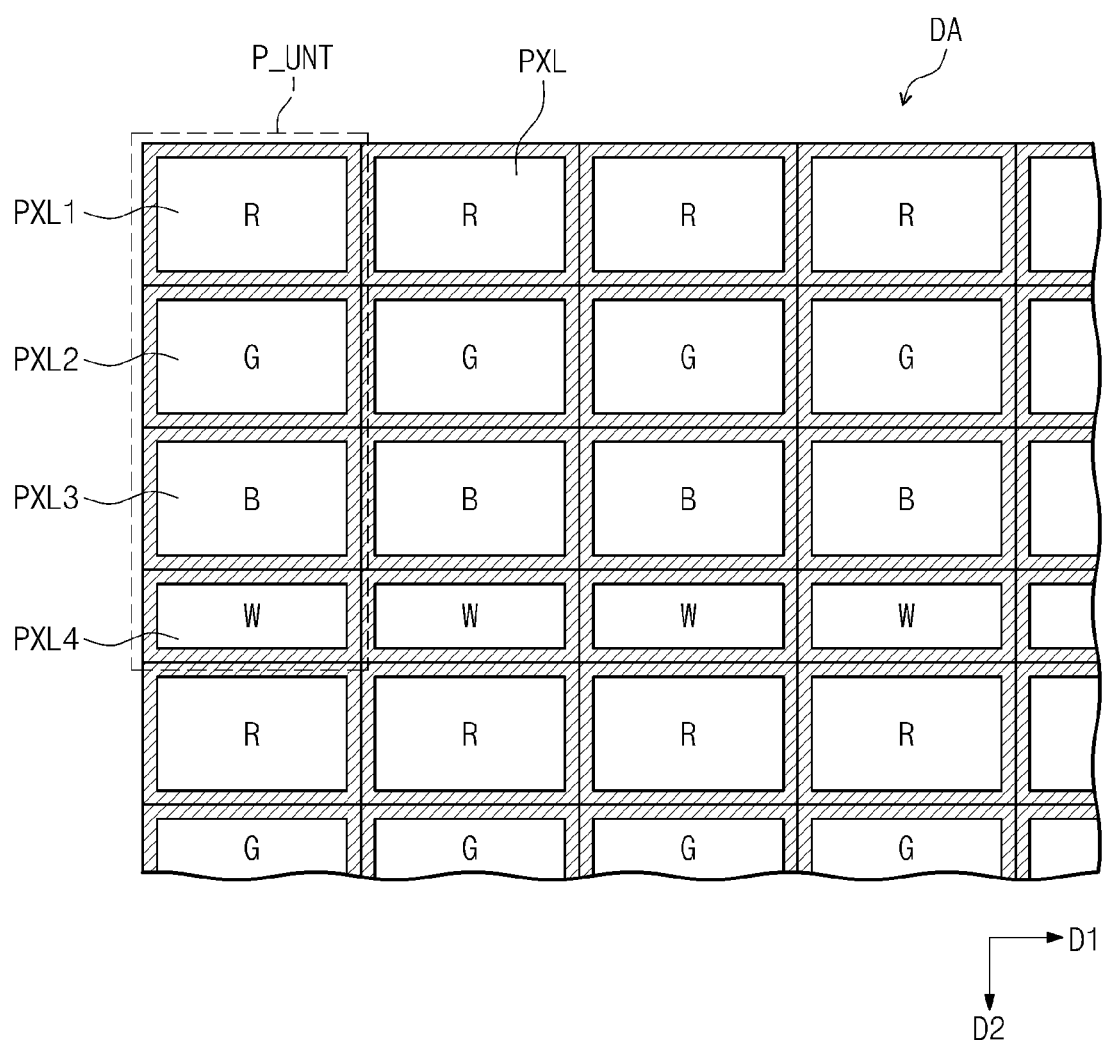
FIG. 7A is a plan view showing a display area when a display apparatus according to a second exemplary embodiment of the present invention is driven in a first mode.
Figure 7B:
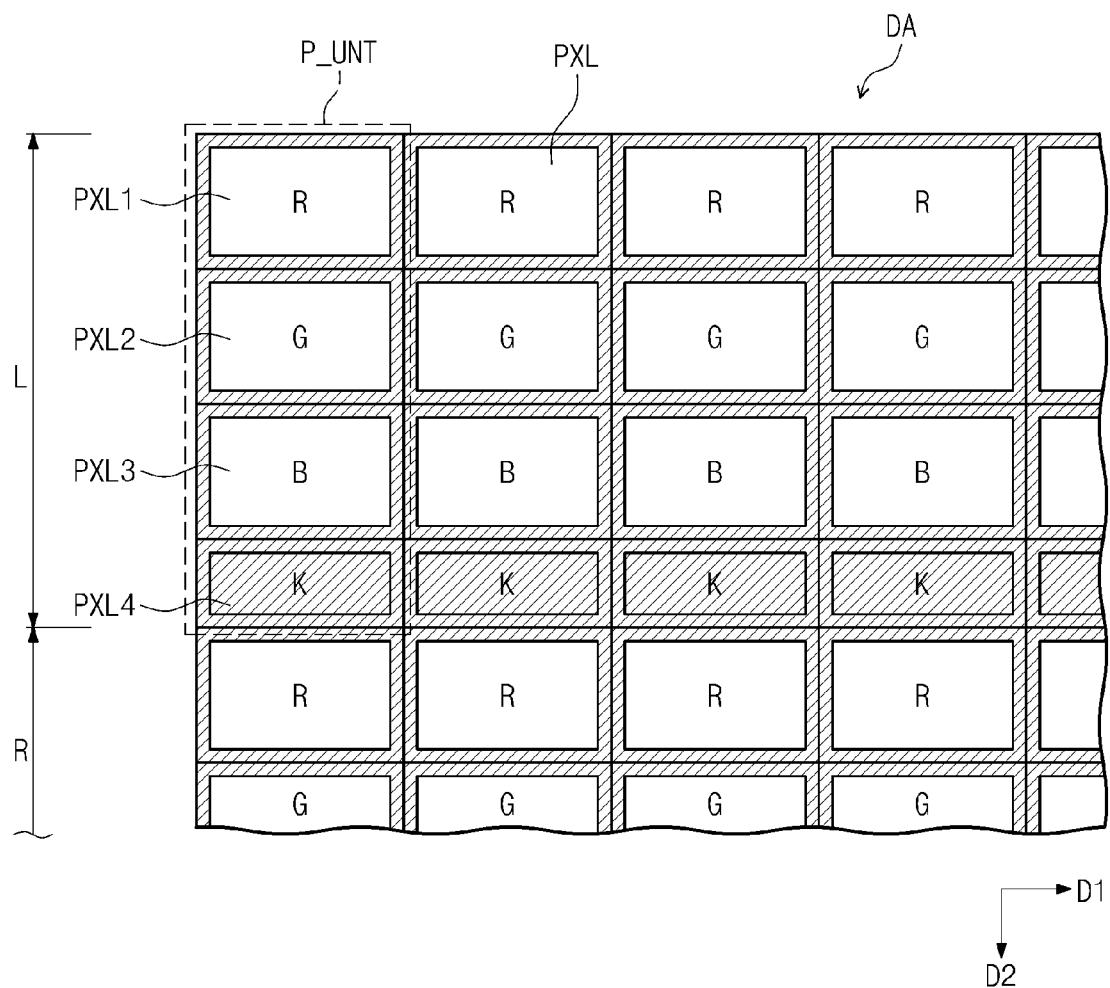
FIG. 7B is a plan view showing a display area when a display apparatus according to a second exemplary embodiment of the present invention is driven in a second mode.

FIG. 7A is a plan view showing a display area when a display apparatus according to a second exemplary embodiment of the present invention is driven in a first mode, and FIG. 7B is a plan view showing a display area when a display apparatus according to a second exemplary embodiment of the present invention is driven in a second mode. In FIGS. 7A and 7B, for the convenience of explanation, the pixels PXL have been schematically shown with colors of the color pixels corresponding to the pixels PXL. In FIGS. 7A and 7B, the reference numerals denote the same elements in FIGS. 5A and 5B, and thus detailed descriptions of the same elements will be omitted.

Referring to FIGS. 7A and 7B, the display apparatus according to the second exemplary embodiment includes a plurality of unit pixels P_UNT arranged in an array of rows and columns. Each unit pixel P-UNT includes the first to fourth pixels PXL1 to PXL4 sequentially arranged in the column direction D2. The first to fourth pixels PXL1 to PXL4 correspond to red, green, blue, and white color pixels R, G, B, and W, respectively. Each of the red, green, blue, and white color pixels R, G, B, and W is surrounded by the black matrix BM to block the light leakage.

In each unit pixel P_UNT, the first to third pixels PXL1 to PXL3 have the same area, but the fourth pixel PXL4 has an area different from the area of each of the first to third pixels PXL1 to PXL3. In FIGS. 7A and 7B, the fourth pixel PXL4 has an area smaller than the area of each of the first to third pixels PXL1 to PXL3, but it should not be limited thereto or thereby. That is, the fourth pixel PXL4 may have an area larger than the area of each of the first to third pixels PXL1 to PXL3.

When the display apparatus is driven in the second mode, the fourth pixel PXL4 in each unit pixel P_UNT displays the black image. As a result, the fourth pixel PXL4 may cause a moiré pattern together with other pixels PXL in the display panel DP and the amount of the light passing through the display panel DP according to the area of the fourth pixel PXL4 displaying the black image. Thus, the area of the fourth pixel PXL4 may be varied so as to prevent the moiré pattern and deterioration of the brightness.

In the second present exemplary embodiment, the area of the fourth pixel PXL4 is different from the area of each of the first to third pixels PXL1 to PXL3, but it should not be limited thereto or thereby. For instance, the first to third pixels PXL1 to PXL3 may have different areas from each other. That is, at least one pixel of the first to fourth pixels PXL1 to PXL4 may have a different area from others. For example, the first to fourth pixels PXL1 to PXL4 may have different areas from each other, or the first, second, and the fourth pixels PXL1, PXL2, and PXL4 may have the same area when the third pixel PXL3 has the largest area. In the case that the first to third pixels PXL1 to PXL3 have different areas from each other, the color reproducibility may be enhanced by enlarging the area of the pixel having low light transmittance with respect to a specific wavelength.

Figure 8:
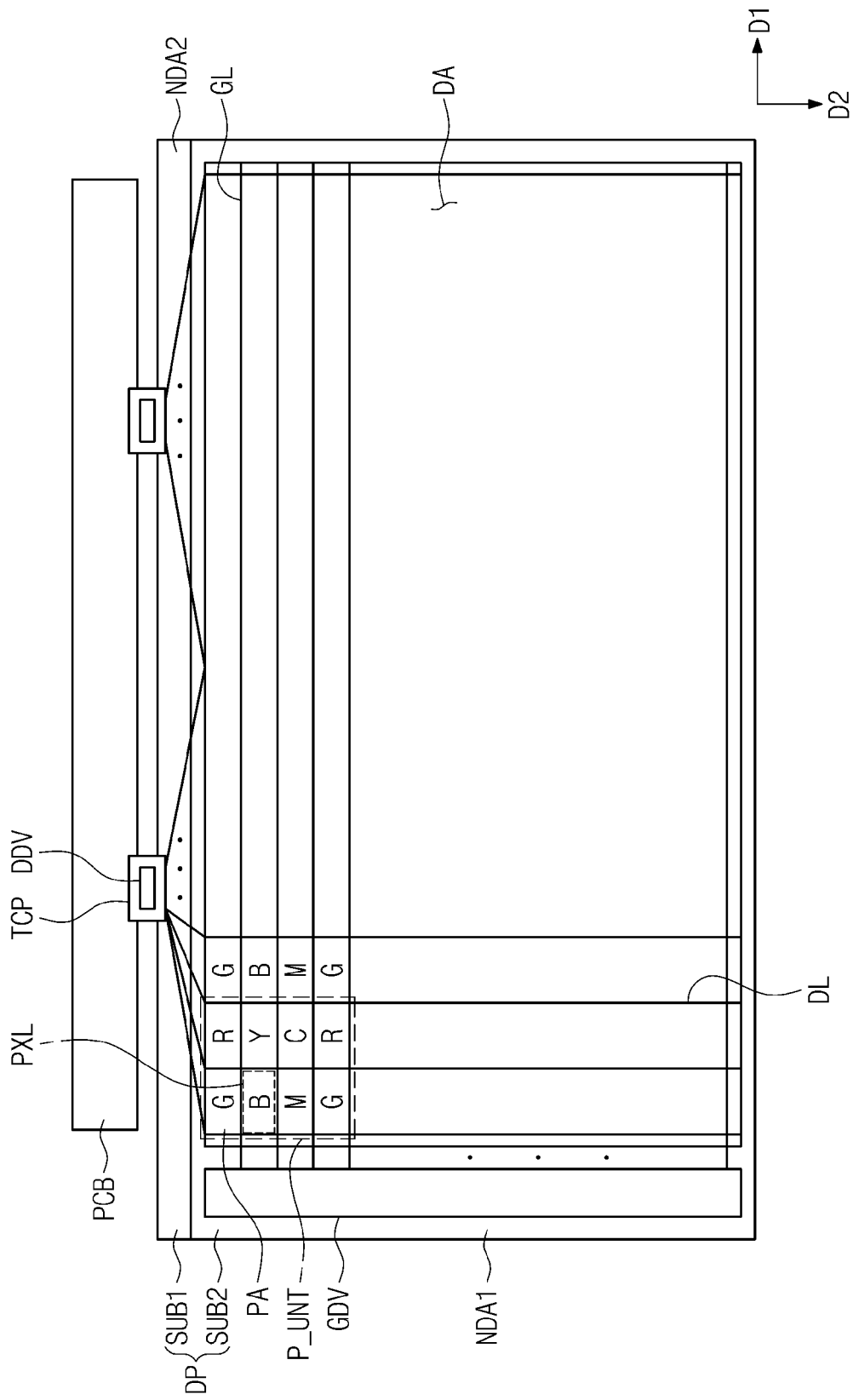
FIG. 8 is a plan view showing a display apparatus according to a third exemplary embodiment of the present invention.
Figure 9:
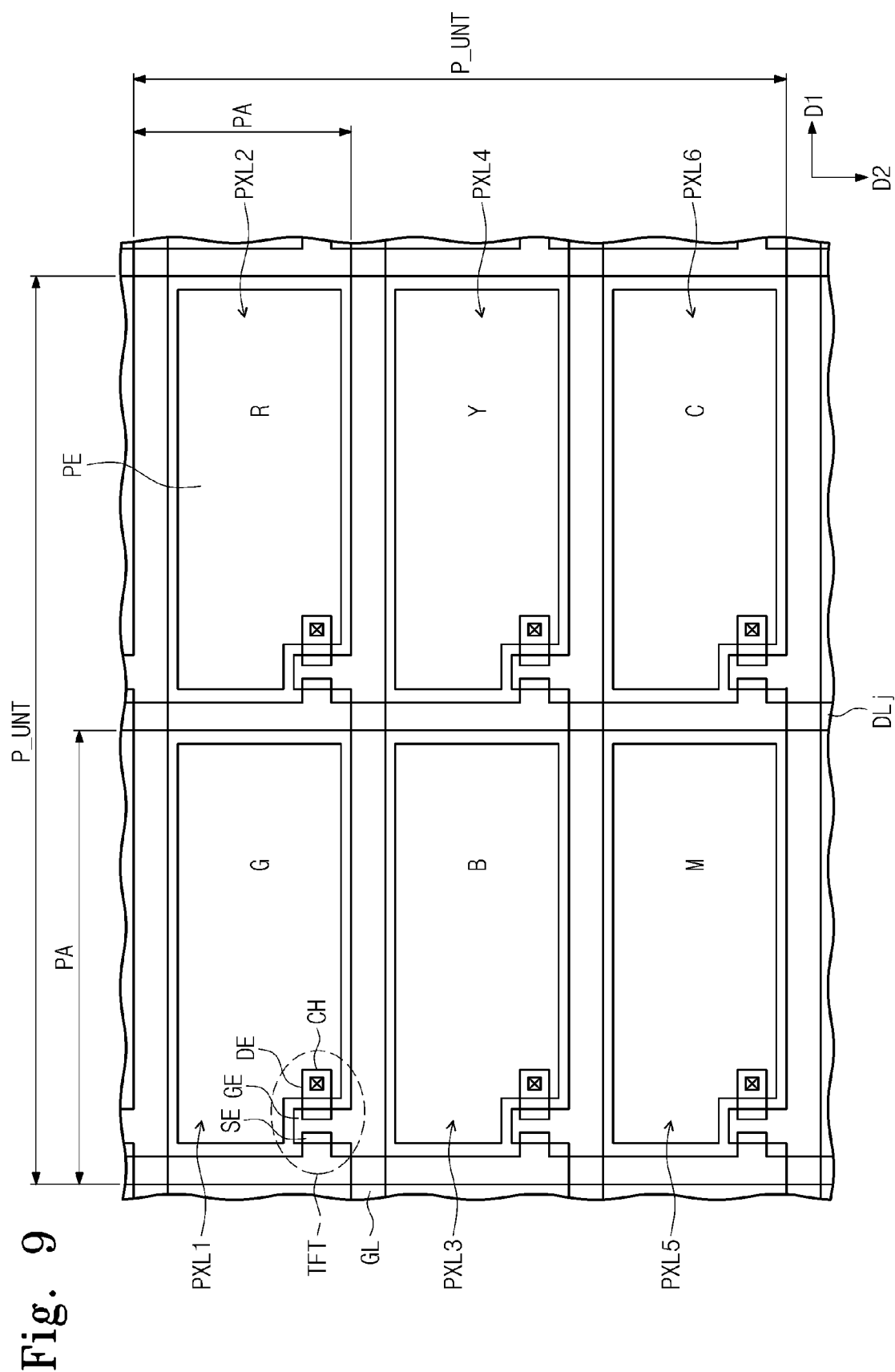
FIG. 9 is a plan view showing a pixel of FIG. 8.

FIG. 8 is a plan view showing a display apparatus according to a third exemplary embodiment of the present invention and FIG. 9 is a plan view showing a pixel of FIG. 8. In FIGS. 8 and 9, the same reference numerals denote the same elements in FIGS. 1 and 2, and thus detailed descriptions of the same elements will be omitted.

Referring to FIGS. 8 and 9, the display panel DP includes a first substrate SUB1, a second substrate SUB2 facing the first substrate SUB1, a liquid crystal layer LC interposed between the first substrate SUB1 and the second substrate SUB2, and a pattern retarder PTR disposed on the second substrate SUB2.

The first substrate SUB1 includes a first insulating substrate INS1, a plurality of gate lines GL, a plurality of data lines DL, a plurality of pixels PXL, and a gate driving circuit GDV.

The first insulating substrate INS1 has a rectangular shape including a pair of long sides and a pair of short sides. The first insulating substrate INS1 includes a display area DA in which the pixels PXL are provided to display the image and first and second non-display areas NDA1 and NDA2 adjacent to the display area DA, in which the image is not displayed. The first non-display area NDA1 is adjacent to ends of the gate lines GL to be adjacent to one of the short sides of the first insulating substrate INS1. The second non-display area NDA2 is adjacent to ends of the data lines DL to be adjacent to one of the long sides of the first insulating substrate INS1.

The display area DA is divided into a plurality of pixel areas PA arranged in an array of rows and columns to correspond to the pixels PXL in a one-to-one correspondence. In the present exemplary embodiment, a row direction D1 of the rows and columns is substantially parallel to the long sides of the first insulating substrate INS1, so that a length of the row direction D1 of the first insulating substrate INS1 is longer than a length of the column direction D2 of the first insulating substrate INS1.

Each pixel PXL has a horizontal pixel structure in which a length of each pixel PXL in the row direction D1 is longer than a length of each pixel PXL in the column direction D2. In the horizontal pixel structure, six pixels PXL serve as one unit pixel P_UNT displaying one color and the unit pixel P_UNT includes first to sixth pixels PXL1 to PXL6 arranged in 3 rows by 2 columns. In addition, the unit pixel P_UNT is provided in a plural number, and the unit pixels P_UNT are arranged in an array of rows and columns. In the unit pixel P_UNT, the pixel arranged in a first row and a first column is referred to as a first pixel PXL1, the pixel arranged in the first row and a second column is referred to as second pixel PXL2, the pixel arranged in a second row and the first column is referred to as a third pixel PXL3, the pixel arranged in the second row and the second column is referred to as a fourth pixel PXL4, the pixel arranged in a third row and the first column is referred to as a fifth pixel PXL5, and the pixel arranged in the third row and the second column is referred to as a sixth pixel PXL6.

Meanwhile, the second substrate SUB2 includes a second insulating substrate INS2 coupled with the first insulating substrate INS1, a color filter layer CF including a plurality of color pixels, a black matrix BM disposed between the color pixels, and a common electrode CE disposed on the color filter layer CF and the black matrix BM. The color filter layer CF includes a plurality of color pixels corresponding to the pixel areas PA in a one-to-one correspondence. The color pixels include a red color pixel R, a green color pixel G, a blue color pixel B, a cyan color pixel C, a magenta color pixel M, and a yellow color pixel Y.

Each of the red, green, blue, cyan, magenta, and yellow color pixels R, G, B, C, M, and Y corresponds to one of the first to sixth pixels PXL1 to PXL6. In the unit pixel P_UNT according to the third exemplary embodiment, the pixel arranged in the first row and the first column corresponds to the green color pixel G, the pixel arranged in the first row and the second column corresponds to the red color pixel R, the pixel arranged in the second row and the first column corresponds to the blue color pixel B, the pixel arranged in the second row and the second column corresponds to the yellow color pixel Y, the pixel arranged in the third row and the first column corresponds to the magenta color pixel M, and the pixel arranged in the third row and the second column corresponds to the cyan color pixel C.

The pattern retarder PTR, the printed circuit board PCB, and the tape carrier package TCP have the same structure and function as those of the pattern retarder PTR, the printed circuit board PCB, and the tape carrier package TCP described in the first exemplary embodiment, and thus details thereof will be omitted.

In the above-described structure of the display apparatus, when the thin film transistor is turned on in response to a driving signal provided through the gate line GL, the data signal is applied to the pixel electrode PE through the data line DL. Thus, an electric field is generated between the pixel electrode PE and the common electrode CE to which a common voltage is applied. As a result, the light amount of the light passing through the liquid crystal layer LC may be controlled, thereby displaying the image corresponding to the light amount of the light passing through the liquid crystal layer LC. In this case, the driving signal and the data signal respectively provided through the gate line GL and the data line DL are varied according to the first and second modes.

Figure 10A:
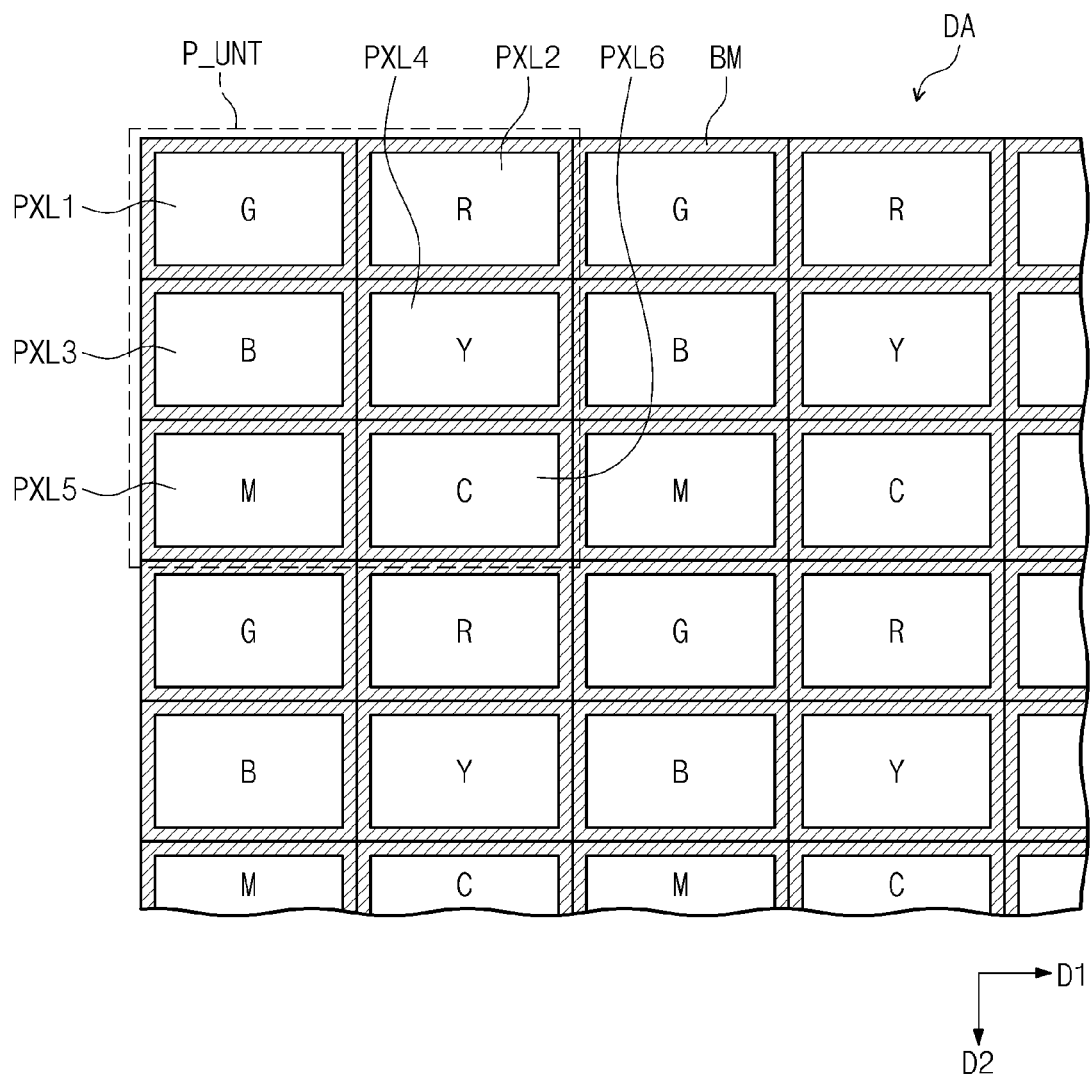
FIG. 10A is a plan view showing a display area when the display apparatus shown in FIG. 8 is driven in a first mode.
Figure 10B:
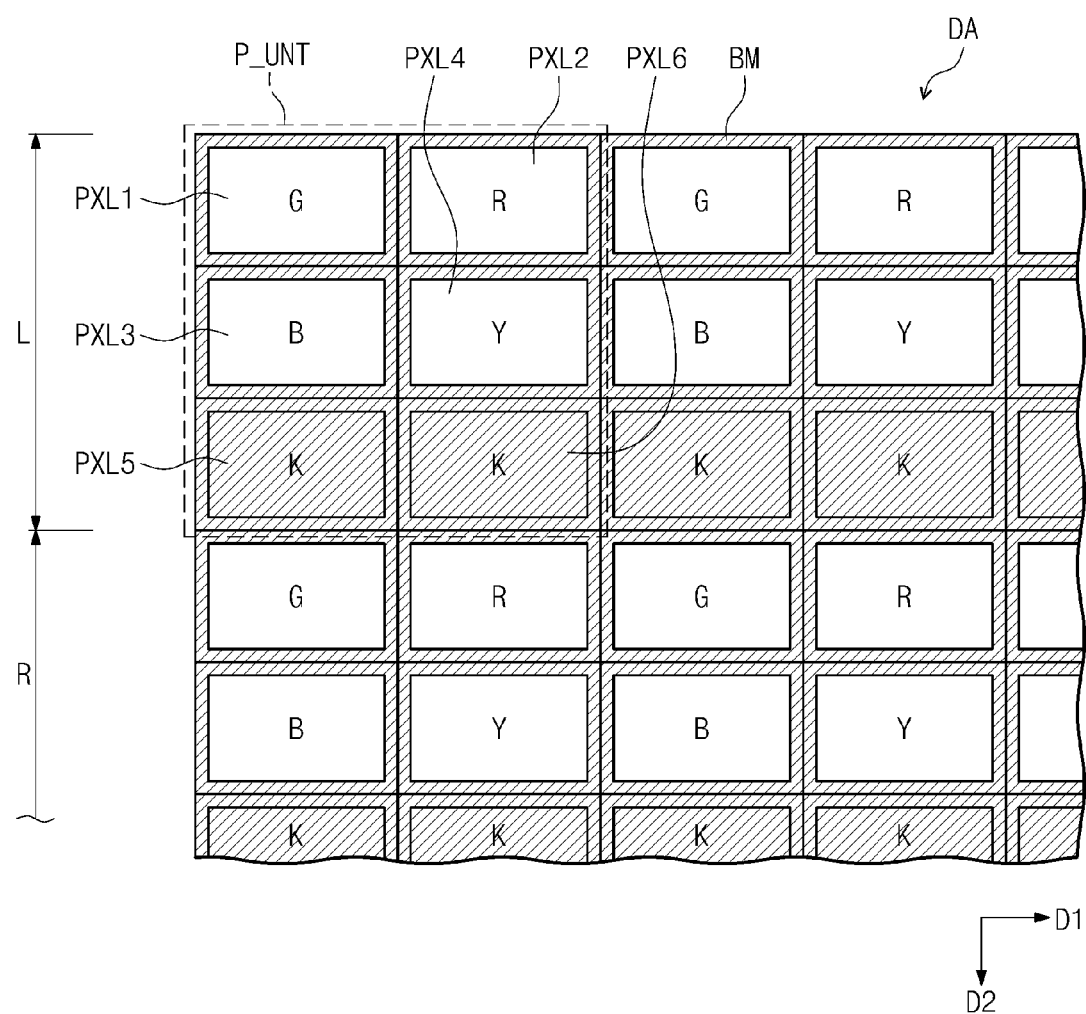
FIG. 10B is a plan view showing a display area when the display apparatus shown in FIG. 8 is driven in a second mode.

FIG. 10A is a plan view showing a display area when the display apparatus shown in FIG. 8 is driven in a first mode and FIG. 10B is a plan view showing a display area when the display apparatus shown in FIG. 8 is driven in a second mode. In FIGS. 10A and 10B, for the convenience of explanation, the pixels PXL have been schematically shown with colors of the color pixels corresponding to the pixels PXL.

Referring to FIGS. 10A and 10B, the first to sixth pixels PXL1 to PXL6 in the unit pixel P_UNT display the green, red, blue, yellow, magenta, and cyan colors, respectively, and the colors displayed by the first to sixth pixels PXL1 to PXL6 are mixed with each other to display one color. Each of the green, red, blue, yellow, magenta, and cyan color pixels G, R, B, Y, M, and C is surrounded by the black matrix BM to block light leakage.

Referring to FIG. 10A, when the display apparatus is driven in the first mode, the data signals of the first mode are applied to the first to sixth pixels PXL1 to PXL6, so the image is displayed by the first to sixth pixels PXL1 to PXL6. The pattern retarder PTR transmits the image displayed by the first to sixth pixels PXL1 to PXL6 when the display apparatus is driven in the first mode, and thus the image displayed by the first to sixth pixels PXL1 to PXL6 is perceived to the users as it is.

In the first mode, since the unit pixel P_UNT includes not only the red color pixel R, the green color pixel G, and the blue color pixel B but also the yellow color pixel Y, the magenta color pixel M, and the cyan color pixel C, the display apparatus according to the present exemplary embodiment may display relatively various colors when compared with the conventional display apparatus. In addition, the color reproduction range of the display apparatus may be widened.

Referring to FIG. 10B, when the display apparatus is driven in the second mode, the data signals of the second mode are applied to the first to sixth pixels PXL1 to PXL6. The data signals of the second mode include the left-eye data signals and the right-eye data signals. The left-eye data signals and the right-eye data signals are alternately applied to the unit pixels P_UNT arranged in the rows. For instance, the left-eye data signals are applied to the unit pixels P_UNT arranged in the odd-numbered row and the right-eye data signals are applied to the unit pixels P_UNT arranged in the even-numbered row.

Each left-eye data signal includes first to sixth data signals that are applied to the first to sixth pixels PXL1 to PXL6, respectively. The first to fourth data signals are used to form the left-eye image. Since the first, second, third, and fourth pixels PXL1, PXL2, PXL3, and PXL4 correspond to the green, red, blue, and yellow color pixels G, R, B, and Y, respectively, the first to fourth pixels PXL1 to PXL4 to which the first to fourth data signals are applied form the left-eye color image.

In this case, the fifth data signal and the sixth data signal are black image signals, and thus the fifth pixel PXL5 and the sixth pixel PXL6 display the black color K.

Similar to the left-eye data signals, each right-eye data signal includes first to sixth data signals applied to the first to sixth pixels PXL1 to PXL6, respectively. The first to fourth data signals are used to form the right-eye image. Since the first, second, third, and fourth pixels PXL1, PXL2, PXL3, and PXL4 respectively correspond to the green, red, blue, and yellow color pixels G, R, B, and Y, the first to fourth pixels PXL1 to PXL4 to which the first to fourth data signals are applied form the right-eye color image. The fifth pixel PXL5 and the sixth pixel PXL6 display the black color K.

When the left-eye data signals and the right-eye data signals are applied to the pixels PXL and the left-eye image and the right-eye image are formed, the pattern retarder PTR splits the light for the left-eye image and the light for the right-eye image into two polarization components. In the case that the pattern retarder PTR includes a first retarder PTR1 polarizing the light for the left-eye image and a second pattern retarder PTR2 polarizing the light for the right-eye image, the first retarder PTR1 corresponds to the unit pixel P_UNT displaying the left-eye image and the second retarder PTR2 corresponds to the unit pixel P_UNT displaying the right-eye image. When the display apparatus is driven in the second mode, the pattern retarder PTR splits the image displayed by the first to fourth pixels PXL1 to PXL4 into the left-eye image and the right-eye image. Accordingly, the image displayed by the first to fourth pixels PXL1 to PXL4 is perceived by the users wearing the polarization glass as a 3D image.

In the second mode, since the unit pixel P_UNT includes not only the red color pixel R, the green color pixel G, and the blue color pixel B but also the yellow color pixel Y, the display apparatus according to the present exemplary embodiment may display relatively various colors when compared with the conventional display apparatus. In addition, the color reproduction range of the display apparatus according to the present exemplary embodiment may be widened.

In the unit pixel P_UNT, three color pixels corresponding to three pixels of the first to fourth pixels PXL1 to PXL4 may be the red color pixel R, the blue color pixel B, and the green color pixel G to maximize the color reproduction range. In this case, a remaining one color pixel corresponding to one pixel of the first to fourth pixels PXL1 to PXL4 may correspond to one of the yellow color pixel Y, the magenta color pixel M, and the cyan color pixel C. Preferably, similar to the color pixels described in the third exemplary embodiment, the remaining color pixel may be the yellow color pixel Y. In this case, the fifth pixel PXL5 and the sixth pixel PXL6, which are arranged in the third row, may correspond to different color pixels from each other of the magenta color pixel M and the cyan color pixel C. Since the magenta color pixel M and the cyan color pixel C are displayed in the black color and the yellow color pixel Y having color reproducibility which is superior to that of the magenta and cyan color pixels M and C corresponds to the pixel PXL in which the image is displayed, the color reproducibility and the brightness may be enhanced when compared with those when the remaining one color pixel corresponds to the magenta color pixel M or the cyan color pixel C.

Figure 11A:
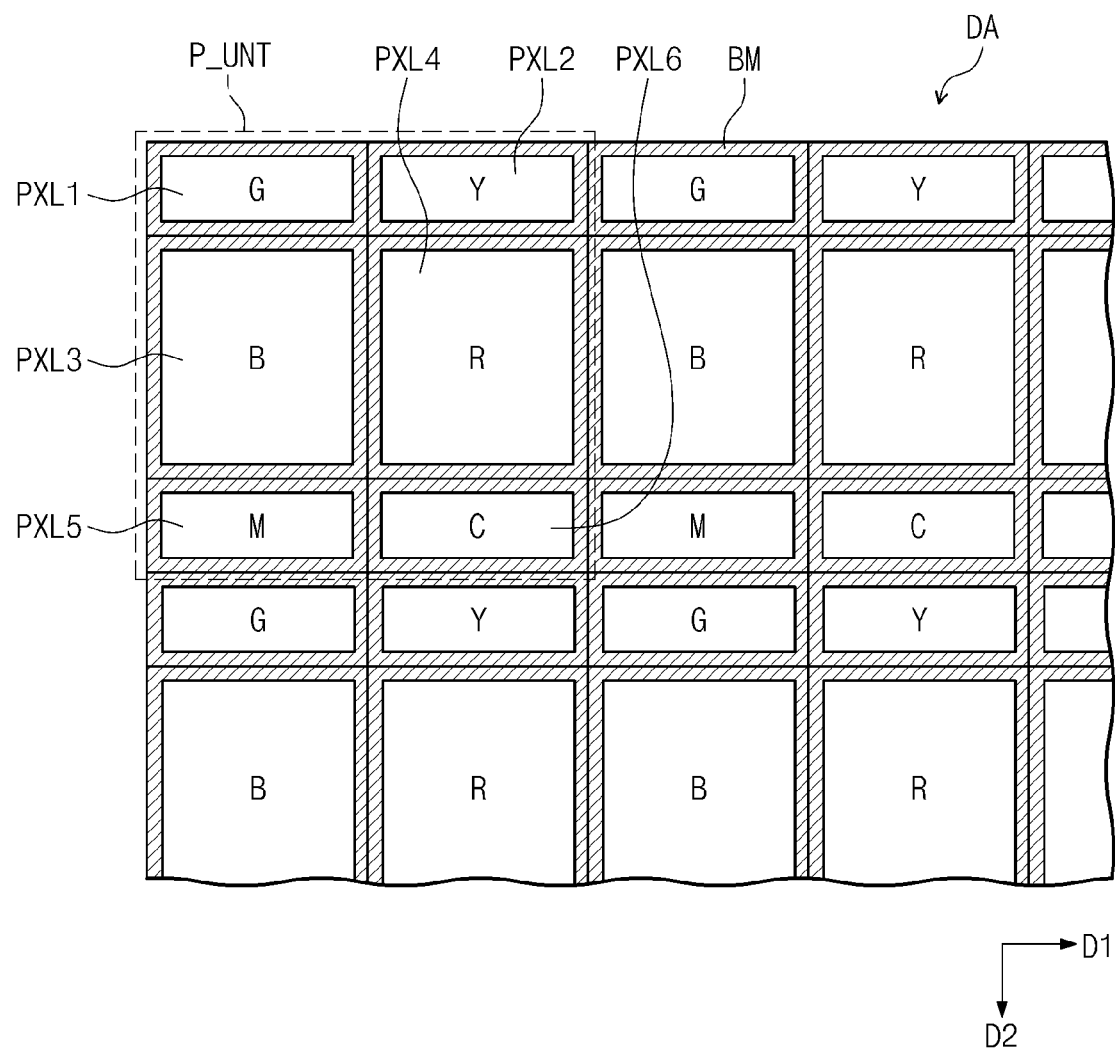
FIG. 11A is a plan view showing a display area when a display apparatus according to a fourth exemplary embodiment of the present invention is driven in a first mode.
Figure 11B:
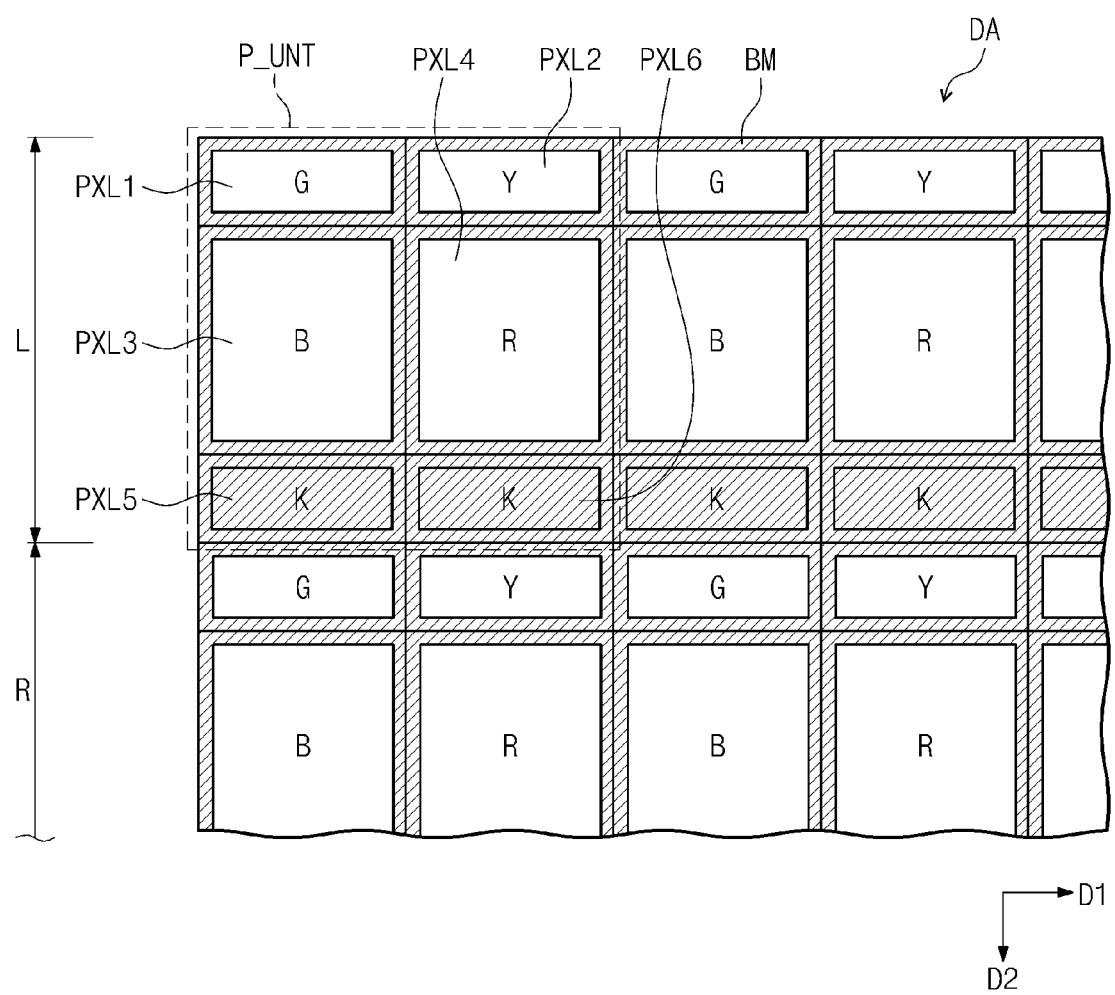
FIG. 11B is a plan view showing a display area when a display apparatus according to a fourth exemplary embodiment of the present invention is driven in a second mode.

FIG. 11A is a plan view showing a display area when a display apparatus according to a fourth exemplary embodiment of the present invention is driven in a first mode, and FIG. 11B is a plan view showing a display area when a display apparatus according to a fourth exemplary embodiment of the present invention is driven in a second mode. In FIGS. 11A and 11B, for the convenience of explanation, the pixels have been schematically shown with the colors of the color pixels corresponding to the pixels.

Referring to FIGS. 11A and 11B, a display apparatus according to the fourth exemplary embodiment includes a plurality of unit pixels P_UNT arranged in an array of rows and columns. Each pixel PXL includes first to sixth pixels PXL1 to PXL6 arranged in 3 rows by 2 columns. In addition, the unit pixel P_UNT is provided in a plural number, and the unit pixels P_UNT are arranged in an array of rows and columns. In the unit pixel P_UNT, the pixel arranged in a first row and a first column is referred to as a first pixel PXL1, the pixel arranged in the first row and a second column is referred to as a second pixel PXL2, the pixel arranged in a second row and the first column is referred to as a third pixel PXL3, the pixel arranged in the second row and the second column is referred to as a fourth pixel PXL4, the pixel arranged in a third row and the first column is referred to as a fifth pixel PXL5, and the pixel arranged in the third row and the second column is referred to as a sixth pixel PXL6. In this case, the first to sixth pixels PXL1 to PXL6 in one unit pixel P_UNT display different colors from each other and each of the first to sixth pixels PXL1 to PXL6 in one unit pixel P_UNT displays one color of green, yellow, blue, red, magenta, and cyan. The colors displayed by the first to sixth pixels PXL1 to PXL6 are mixed with each other to display one color. Each of the color pixels is surrounded by the black matrix BM to block the light leakage.

In the unit pixel P_UNT, the pixels arranged in the first to third rows may have different areas from each other according to the kind of the color pixels corresponding to the pixels arranged in the first to third rows. In detail, the pixels corresponding to the color pixels having relatively lower brightness and color reproducibility than other color pixels may have relatively wider area than other pixels. For instance, since the red color pixel R and the blue color pixel B have lower transmittance with respect to the external light than the green color pixel G, the pixels corresponding to the red and blue color pixels R and B have an area larger than the area of the pixel corresponding to the green color pixel G.

Referring to FIG. 11A, when the display apparatus is driven in the first mode, the data signals of the first mode are applied to the first to sixth pixels PXL1 to PXL6, so the image is displayed by the first to sixth pixels PXL1 to PXL6. The pattern retarder PTR transmits the image displayed by the first to sixth pixels PXL1 to PXL6 when the display apparatus is driven in the first mode, and thus the image displayed by the first to sixth pixels PXL1 to PXL6 is perceived to the users as it is.

In the first mode, since the unit pixel P_UNT includes not only the red color pixel R, the green color pixel G, and the blue color pixel B but also the yellow color pixel Y, the magenta color pixel M, and the cyan color pixel C, the display apparatus according to the present exemplary embodiment may display relatively various colors when compared with the conventional display apparatus. In addition, the color reproduction range of the display apparatus may be widened.

Referring to FIG. 11B, when the display apparatus is driven in the second mode, the data signals of the second mode are applied to the first to sixth pixels PXL1 to PXL6. The data signals of the second mode include the left-eye data signals and the right-eye data signals. The left-eye data signals and the right-eye data signals are alternately applied to the unit pixels P_UNT arranged in the rows. For instance, the left-eye data signals are applied to the unit pixels P_UNT arranged in the odd-numbered rows and the right-eye data signals are applied to the unit pixels P_UNT arranged in the even-numbered rows.

The process of displaying the image when the display apparatus is driven in the second mode is the same as the process of displaying the image described in the third exemplary embodiment, and thus details thereof will be omitted.

In the second mode, since the unit pixel P_UNT includes not only the red color pixel R, the green color pixel G, and the blue color pixel B but also the yellow color pixel Y, the display apparatus according to the present exemplary embodiment may display relatively various colors when compared with the conventional display apparatus. In addition, the color reproduction range of the display apparatus according to the present exemplary embodiment may be widened.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
    a first substrate comprising a plurality of pixel areas arranged in an array of rows and columns, the first substrate having a length in a row direction longer than a length in a column direction and each of the pixel areas having a length in the row direction longer than a length in the column direction;
    a plurality of pixels arranged in the pixel areas, respectively, to display an image in response to an image signal;
    a second substrate facing the first substrate;
    a color filter layer disposed on the second substrate and comprising color pixels corresponding to the pixel areas in a one-to-one correspondence, the color pixels comprising red, green, blue, and white color pixels; and
    a pattern retarder disposed to face the first substrate, the second substrate being interposed between the first substrate and the pattern retarder, to split light passing through the first and second substrates into two lights having different polarizing axes from each other,
    wherein first to fourth pixels successively arranged in the column direction among the pixels define a unit pixel that displays one color information, and the fourth pixel corresponds to the white color pixel.

2. The display apparatus of claim 1, further comprising a driving circuit configured to be driven in one of a first mode in which a 2D image is displayed and a second mode in which a 3D image is displayed, wherein the driving circuit applies a 2D image signal to the pixels in the first mode and applies a 3D image signal to the pixels in the second mode.

3. The display apparatus of claim 2, wherein the driving circuit is configured to apply a black image signal to the fourth pixel in the second mode such that the fourth pixel displays a black color in the second mode.

4. The display apparatus of claim 3, further comprising a plurality of gate lines connected to the pixels and extended in the row direction and a plurality of data lines connected to the pixels and extended in the column direction, wherein the driving circuit comprises a gate driving circuit configured to sequentially apply a gate signal to the gate lines and a data driving circuit integrated in one chip and configured to apply the image signal to the data lines.

5. The display apparatus of claim 4, wherein the gate driving circuit comprises a plurality of amorphous silicon transistors that are directly formed on the first substrate to be adjacent to a short side of the first substrate, and the data driving circuit is disposed adjacent to a long side of the first substrate to output the image signal to the pixels in response to the gate signal.

6. The display apparatus of claim 4, wherein each of the first to fourth pixels comprises:
    a thin film transistor connected to a corresponding gate line of the gate lines and a corresponding data line of the data lines;
    a pixel electrode connected to the thin film transistor;
    a common electrode disposed on the color filter layer; and
    a liquid crystal layer disposed between the pixel electrode and the common electrode.

7. The display apparatus of claim 3, wherein each of the first to third pixels corresponds to a different one of the red, green, and blue color pixels.

8. The display apparatus of claim 7, wherein each of the first to third pixels has an area larger than an area of the fourth pixel.

9. The display apparatus of claim 1, further comprising a plurality of the unit pixels, wherein the pattern retarder comprises first retarders and second retarders alternately arranged with the first retarders in the column direction, the first retarders correspond to the unit pixels arranged in odd-numbered rows, and the second retarders correspond to the unit pixels arranged in even-numbered rows.

10. The display apparatus of claim 9, wherein a portion of the light is polarized in a first light having a first polarization axis by the first retarders and a portion of the light is polarized in a second light having a second polarization axis by the second retarders.

11. A display apparatus comprising:
    a first substrate comprising a plurality of pixel areas arranged in an array of rows and columns, the first substrate having a length in a row direction longer than a length in a column direction and each of the pixel areas having a length in the row direction longer than a length in the column direction;

a plurality of pixels arranged in the pixel areas, respectively, to display an image in response to an image signal;

a second substrate facing the first substrate;

a color filter layer disposed on the second substrate and comprising color pixels corresponding to the pixel areas in a one-to-one correspondence, the color pixels comprising red, green, blue, cyan, magenta, and yellow color pixels; and a pattern retarder disposed to face the first substrate, the second substrate being interposed between the first substrate and the pattern retarder, to split light passing through the first substrate and the second substrate into two lights having different polarizing axes from each other, wherein:

first to sixth pixels arranged in 3 rows (first, second, and third rows) by 2 columns (first and second columns) among the pixels define a unit pixel that displays one color information, and each of the first to sixth pixels corresponds to a different one of the red, green, blue, cyan, magenta, and yellow color pixels; and the pixels arranged in the third row of all of the unit pixels correspond to the magenta color pixel and the cyan color pixel.

12. The display apparatus of claim 11, further comprising a driving circuit configured to be driven in a first mode in which a 2D image is displayed or in a second mode in which a 3D image is displayed, wherein the driving circuit applies a 2D image signal to the pixels in the first mode and applies a 3D image signal to the pixels in the second mode.

13. The display apparatus of claim 12, wherein the driving circuit is configured to apply a black image signal to the pixels arranged in the third row in the second mode such that the pixels arranged in the third row display a black color in the second mode.

14. The display apparatus of claim 13, wherein the red and blue color pixels correspond to the pixels arranged in the first row or the pixels arranged in the second row, and each of the pixels corresponding to the red and blue color pixels has an area larger than an area of the pixels not corresponding to the red and blue color pixels.

15. The display apparatus of claim 14, wherein the pixels not corresponding to the red and blue color pixels correspond to the green and yellow color pixels.

16. The display apparatus of claim 12, further comprising a plurality of gate lines connected to the pixels and extended in the row direction and a plurality of data lines connected to the pixels and extended in the column direction, wherein the driving circuit comprises a gate driving circuit configured to sequentially apply a gate signal to the gate lines and a data driving circuit integrated in one chip and configured to to apply the image signal to the data lines.

17. The display apparatus of claim 16, wherein the gate driving circuit comprises a plurality of amorphous silicon transistors that are directly formed on the first substrate to be adjacent to a short side of the first substrate, and the data driving circuit is disposed adjacent to a long side of the first substrate to output the image signal to the pixels in response to the gate signal.

18. The display apparatus of claim 11, further comprising a plurality of the unit pixels, wherein the pattern retarder comprises first retarders and second retarders alternately arranged with the first retarders in the column direction, the first retarders correspond to the unit pixels arranged in odd-numbered rows, and the second retarders correspond to the unit pixels arranged in even-numbered rows.

19. The display apparatus of claim 18, wherein a portion of the light is polarized in a first light having a first polarization axis by the first retarders and a portion of the light is polarized in a second light having a second polarization axis by the second retarders.

* * * * *